(12) United States Patent
Han

(10) Patent No.: US 10,956,776 B2
(45) Date of Patent: Mar. 23, 2021

(54) 2D CONVOLUTIONAL ACCELERATOR THAT GENERATES 3D RESULTS

(71) Applicant: Alibaba Group Holding Limited, Grand Cayman (KY)

(72) Inventor: Liang Han, Campbell, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/532,706

(22) Filed: Aug. 6, 2019

(65) Prior Publication Data

US 2021/0042566 A1 Feb. 11, 2021

(51) Int. Cl.
G06K 9/62 (2006.01)
G06K 9/38 (2006.01)
G06N 3/04 (2006.01)
G06F 9/38 (2018.01)

(52) U.S. Cl.
CPC ......... *G06K 9/6203* (2013.01); *G06F 9/3877* (2013.01); *G06K 9/6226* (2013.01); *G06N 3/0418* (2013.01)

(58) Field of Classification Search
CPC .. G06K 9/6203; G06K 9/3877; G06K 9/6226; G06N 3/0418
See application file for complete search history.

(56) References Cited

U.S. PATENT DOCUMENTS

| | | |
|---|---|---|
| 2019/0188554 A1 | 6/2019 | Ma et al. |
| 2019/0197325 A1 | 6/2019 | Reiley et al. |
| 2019/0205163 A1 | 7/2019 | Veernapu et al. |
| 2019/0205736 A1 | 7/2019 | Bleiweiss et al. |
| 2019/0205737 A1 | 7/2019 | Bleiweiss et al. |
| 2019/0205745 A1 | 7/2019 | Sridharan et al. |
| 2019/0205746 A1 | 7/2019 | Nurvitadhi et al. |
| 2019/0205747 A1 | 7/2019 | Srivastava |
| 2019/0206020 A1 | 7/2019 | Ould-Ahmed-Vall et al. |
| 2019/0206090 A1 | 7/2019 | Ray et al. |
| 2019/0209867 A1 | 7/2019 | Sun et al. |
| 2019/0212749 A1 | 7/2019 | Chen et al. |
| 2019/0220746 A1* | 7/2019 | Liu .......................... G06N 3/08 |
| 2019/0236049 A1* | 8/2019 | Vantrease ............... G06N 3/063 |
| 2019/0243371 A1 | 8/2019 | Nister et al. |
| 2019/0243764 A1 | 8/2019 | Sakthivel et al. |
| 2019/0250622 A1 | 8/2019 | Nister et al. |
| 2019/0258907 A1 | 8/2019 | Rezende et al. |
| 2019/0261945 A1 | 8/2019 | Funka-Lea et al. |
| 2019/0266418 A1 | 8/2019 | Xu et al. |
| 2019/0266485 A1 | 8/2019 | Singh et al. |
| 2019/0278434 A1 | 9/2019 | Holzer et al. |
| 2019/0286153 A1 | 9/2019 | Rankawat et al. |

(Continued)

OTHER PUBLICATIONS

Kartik Hegde, et al, "Morph: Flexible Acceleration for 3D CNN-based Video Understanding, Micro 2018", 14 pages.

(Continued)

*Primary Examiner* — Haixia Du

(57) ABSTRACT

A two-dimensional (2D) convolutional accelerator generates three-dimensional (3D) results by computing a plurality of running dot product totals for a plurality of shift positions for the frames in a sliding frame group such that each shift position has a running dot product total, and storing the plurality of running dot product totals in the elements of an output array.

20 Claims, 14 Drawing Sheets

(56) References Cited

U.S. PATENT DOCUMENTS

2019/0294897 A1 9/2019 Cohen et al.
2019/0295211 A1 9/2019 Appu et al.
2020/0234137 A1* 7/2020 Chen ..................... G06N 3/082

OTHER PUBLICATIONS

Vivienne Sze, et al, Efficient Processing of Deep Neural Networks: A Tutorial and Survey, Proceedings of the IEEE, vol. 105, No. 12, Dec. 2017, 32 pages.

* cited by examiner

2D CONVOLUTIONAL ACCELERATOR THAT GENERATES 3D RESULTS

BACKGROUND OF THE INVENTION

1. Field of the Invention

The present application relates to the field of convolutional neural networks and, in particular, to a 2D convolutional accelerator that generates 3D results.

2. Description of the Related Art

A convolutional neural network (CNN) is a type of artificial neural network that is frequently used to detect patterns. CNNs commonly operate on the two-dimensional (2D) image output by an imaging device. The 2D image, in turn, is formed from a pixel array that has rows and columns of values that represent the image captured by the imaging device.

FIG. 1 shows a block diagram that illustrates an example of a conventional 2D CNN 100. As shown in FIG. 1, 2D CNN 100 includes an input layer 110, a series of intermediate layers IL1-ILn, and an output layer 120. The primary operations in the input and intermediate layers of CNN 100 are convolutional operations.

With the recent rapid development in machine learning, CNNs are being developed to operate on the three-dimensional (3D) output of a video device which, in turn, allows a CNN to be able to detect, for example, movement. In this case, the third dimension is time with the video being sampled periodically to generate a series of 2D static images.

One drawback to the widespread use of 3D CNNs is the long development time. Developing 3D dedicated hardware accelerators can take months or even years of engineering time, and also has a much higher cost than 2D convolutional accelerators. In addition, 2D convolutional accelerators are a poor replacement for 3D convolutional accelerators because 3D convolutional algorithms typically require several orders of magnitude more computing and data buffering ability than 2D convolutional algorithms.

As a result, there is a need for an approach to 3D convolution acceleration that reduces the engineering time and cost.

SUMMARY OF THE INVENTION

The present invention provides 3D convolution acceleration on a 2D convolutional accelerator. The present invention provides a method of operating a 2D convolutional accelerator. The method includes receiving a plurality of input frames and a plurality of kernel channels in each of a plurality of convolutional layers. Each of the input frames includes a matching sequence of input channels of pixel arrays, while the pixel arrays include a shift array that has a plurality of shift positions within the pixel arrays. Each of the kernel channels includes a plurality of kernel groups that correspond with the plurality of input frames. Each kernel group has a matching sequence of kernel arrays that correspond with the sequence of pixel arrays. The method also includes determining in each convolutional layer a number of sliding groups from the plurality of input frames where each sliding group has a number of input frames. The method additionally includes convolving in each convolutional layer the input frames in the sliding groups with the kernel groups in the plurality of kernel channels to generate a number of output frames that correspond with the number of sliding groups. Each output frame has a number of output channels. Each output channel has an output array. Each output array has a number of entries that correspond with the plurality of shift positions. A last convolution to output a last frame. The last frame has a last channel. The last channel has a last array. In addition, the method includes generating a plurality of labels with probabilities based on the last array of the last channel of the last frame. Further, the method includes outputting the label with a highest probability as a detected action pattern.

The present invention also provides a two-dimensional convolutional accelerator. The accelerator includes a computing system that has a plurality of core processors. The core processors to receive a plurality of input frames and a plurality of kernel channels in each of a plurality of convolutional layers. Each of the input frames has a matching sequence of input channels of pixel arrays. The pixel arrays include a shift array that has a plurality of shift positions within the pixel arrays. Each of the kernel channels includes a plurality of kernel groups that correspond with the plurality of input frames. Each kernel group has a matching sequence of kernel arrays that correspond with the sequence of pixel arrays. The computing system to further determine in each convolutional layer a number of sliding groups from the plurality of input frames where each sliding group has a number of input frames. In addition, the computing system to convolve in each convolutional layer the input frames in the sliding groups with the kernel groups in the plurality of kernel channels to generate a number of output frames that correspond with the number of sliding groups. Each output frame has a number of output channels. Each output channel has an output array. Each output array has a number of entries that correspond with the plurality of shift positions. A last convolutional layer to output a last frame. The last frame has a last channel. The last channel has a last array. The accelerator also includes a classifier coupled to the computing system. The classifier to generate a list of labels with probabilities based on the last frame, the last channel, and the last array. In addition, the classifier to output a label with a highest probability as a detected action pattern.

The present invention additionally provides a non-transitory computer-readable storage medium having embedded therein program instructions, which when executed by a processor causes the processor to execute a method of operating a convolutional neural network. The method includes receiving a plurality of input frames and a plurality of kernel channels in each of a plurality of convolutional layers. Each of the input frames includes a matching sequence of input channels of pixel arrays, while the pixel arrays include a shift array that has a plurality of shift positions within the pixel arrays. Each of the kernel channels includes a plurality of kernel groups that correspond with the plurality of input frames. Each kernel group has a matching sequence of kernel arrays that correspond with the sequence of pixel arrays. The method also includes determining in each convolutional layer a number of sliding groups from the plurality of input frames where each sliding group has a number of input frames. The method additionally includes convolving in each convolutional layer the input frames in the sliding groups with the kernel groups in the plurality of kernel channels to generate a number of output frames that correspond with the number of sliding groups. Each output frame has a number of output channels. Each output channel has an output array. Each output array has a number of entries that correspond with the plurality of shift positions. A last convolutional layer to output a last frame. The last frame has a last channel. The last channel has a last array. In addition, the method includes generating a plurality of labels with probabilities based on the last array in the last channel of the last frame. Further, the method includes outputting the label with a highest probability as a detected action pattern.

A better understanding of the features and advantages of the present invention will be obtained by reference to the following detailed description and accompanying drawings which set forth an illustrative embodiment in which the principals of the invention are utilized.

Figure 1:
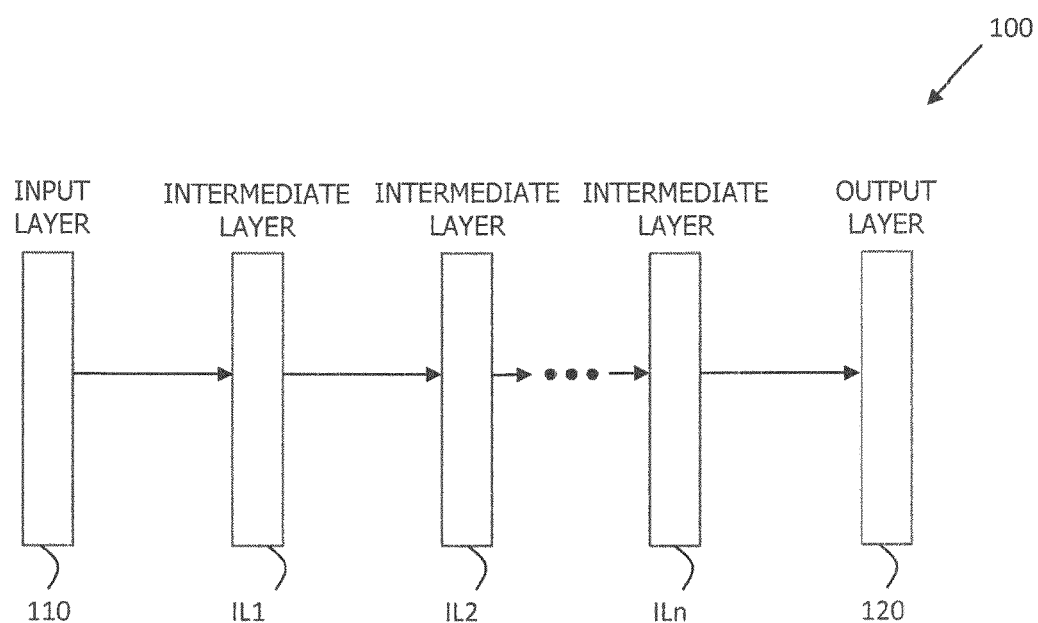
FIG. 1 is a block diagram illustrating an example of a conventional 2D CNN 100.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

FIGS. 2A-2H show a series of views that illustrates an example of 3D acceleration on a 2D convolutional accelerator 200 in accordance with the present invention. Accelerator 200 receives a series of input frames FR1-FRm. Each of the input frames FR has a matching sequence of input channels C1-Cn of pixel arrays PA1-PAn. The pixel arrays PA1-PAn include a shift array SA that has a number of shift positions SP1-SPr within the pixel arrays PA.

In the FIGS. 2A-2H example, the series of input frames are illustrated with a series of 100 video frames FR1-FR100 that are received from an imaging device. The series of video frames FR1-FR100 are broken into a series of sliding groups SG1-SGs that each has a number of video frames FR. For example, a series of 100 frames FR1-FR100 can be broken into 94 sliding groups that each has 7 frames. In this example, a first sliding group SG1 has frames FR1-FR7, a second sliding group SG2 has frames FR2-FR8, a third sliding group SG3 has frames FR3-FR9, and so on.

In addition, the sequence of input channels C1-Cn of pixel arrays PA1-PAn is illustrated with four input channels C1-C4 and four pixel arrays PA1-PA4, although other numbers of input channels and pixel arrays can alternately be utilized. Further in the present example, the sequence of pixel arrays PA1-PA4 of the input channels C1-C4 are illustrated with color-based pixel arrays PA, including a C1 red pixel array PA1, a C2 green pixel array PA2, a C3 blue pixel array PA3, and a C4 depth pixel array PA4.

Convolutional accelerator 200 also receives a series of kernel channels KC1-KCt. Each kernel channel KC includes a series of kernel groups KG1-KGm that correspond with the series of frames FR1-FRm. Each kernel group KG, in turn, has a matching sequence of kernel arrays KA1-KAn that corresponds with the sequence of pixel arrays PA1-PA4.

In the FIGS. 2A-2H example, the series of kernel channels KC are illustrated with 64 kernel channels KC1-KC64, although other numbers of kernel channels can alternately be used. The kernel channels KC, in turn, are illustrated with 100 kernel groups KG1-KG100 that correspond with the 100 frames FR1-FR100, and the kernel arrays KA1-KAn are illustrated with four kernel arrays KA1-KA4 that correspond with the pixel arrays PA1-PA4.

For example, the C1 red pixel array PA1 of frame FR1 has a corresponding red kernel array KA1 of kernel group KG1, while the C2 green pixel array PA2 of frame FR1 has a corresponding green kernel array KA2 of kernel group KG1. Each kernel group KG is typically unique, and the kernel arrays KA in each kernel group KG are typically unique.

Further, each kernel array KA has a number of pixels or entries. In the present example, each kernel array KA is illustrated as a 3×3 array which, in turn, has nine pixels/entries. Alternately, other kernel array sizes can be utilized. In addition, the size of the kernel array KA defines the size of a shift array SA that outlines the region of a pixel array PA to be multiplied. For example, a 3×3 kernel array defines a 3×3 shift array, which also has nine pixels/entries, within the pixel array PA.

In addition, the size of the pixel array PA and the size of the kernel array KA define a number of shift positions SP of the shift array SA within a pixel array PA. For example, a 3×3 shift array SA has 9 shift positions utilizing a stride of 1 within a 5×5 pixel array PA, while a 3×3 shift array SA has 16 shift positions utilizing a stride of 1 within a 6×6 pixel array PA.

Figure 2A:
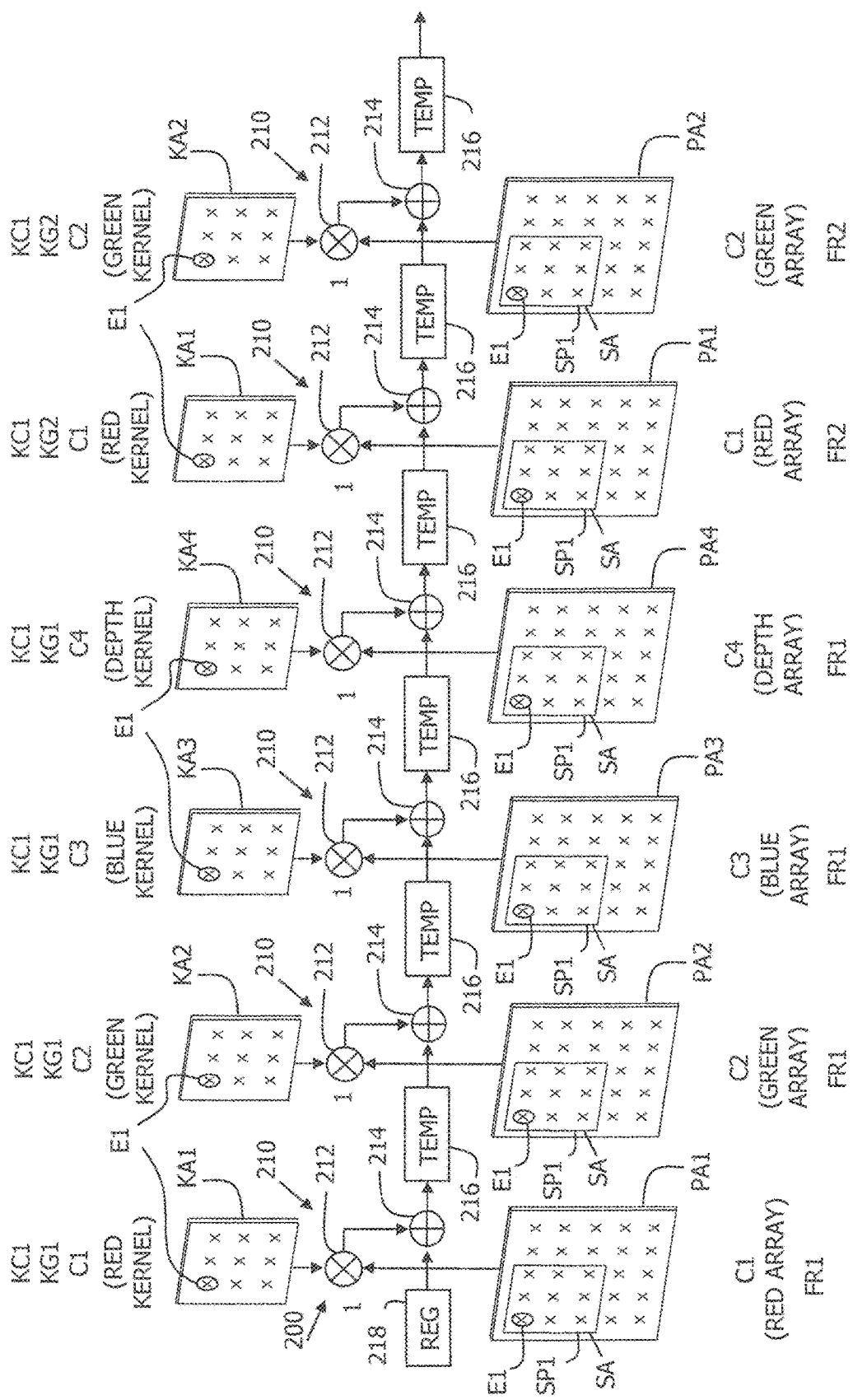
FIGS. 2A-2H are views illustrating an example of 3D acceleration on a 2D convolutional accelerator 200 in accordance with the present invention.
Figure 2B:
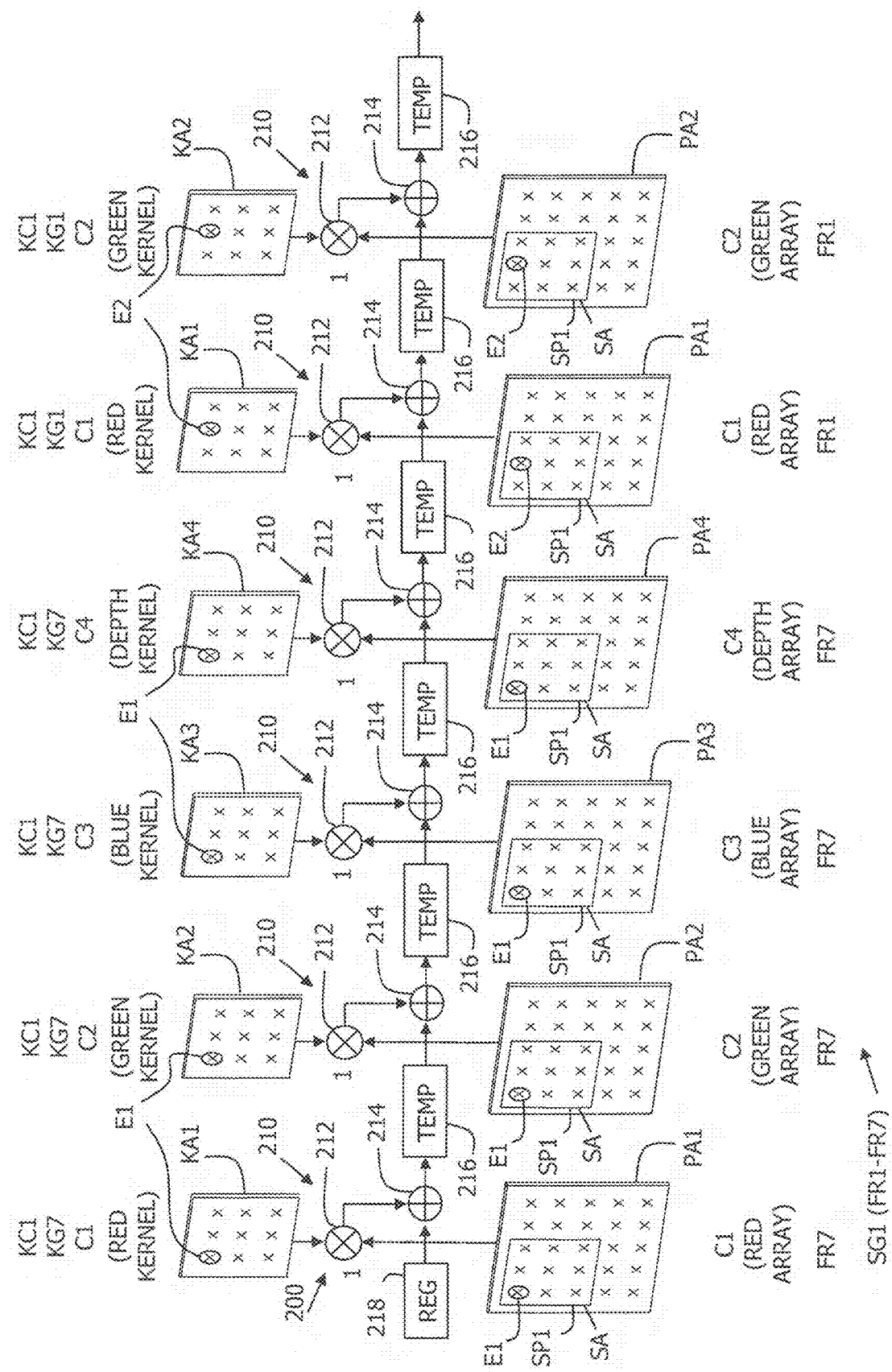
Figure 2C:
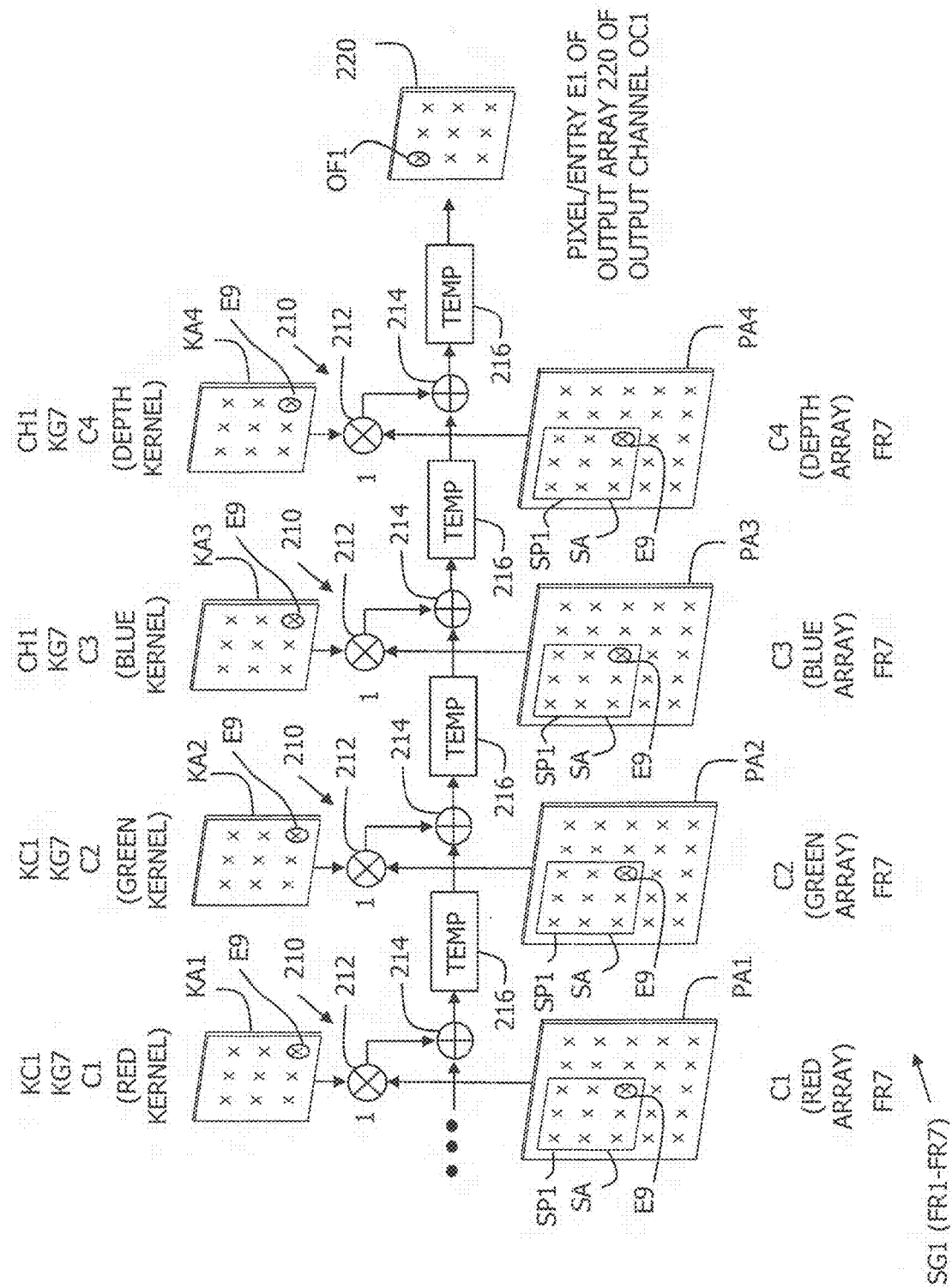

Further, the size of the pixel array PA and the size of the kernel array KA define the size of an output array, which is also known as a feature map (e.g., FIG. 2C). In the present example, each pixel array PA of an input channel C is represented as a 5×5 array for purposes of illustration only. Actual input channel pixel arrays are typically much larger (e.g., 224×224, 1024×768).

As further shown in the FIGS. 2A-2H example, 2D convolutional accelerator 200 includes one or more convolvers 210 that each include a multiplier 212, an adder 214 coupled to multiplier 212, and a temporary storage register 216 coupled to adder 214. In addition, a register 218 can provide an initial value for the first adder 214.

FIGS. 2A-2H show a convolver 210 associated with each pixel/entry E of each shift array SA of each pixel array PA to illustrate the 3D acceleration. Alternately, accelerator 200 can be implemented with other numbers of convolvers 210 where the output of the last convolver 210 is fed back into the input of the first convolver 210 by way of register 218 to complete the necessary convolutions.

Figure 2D:
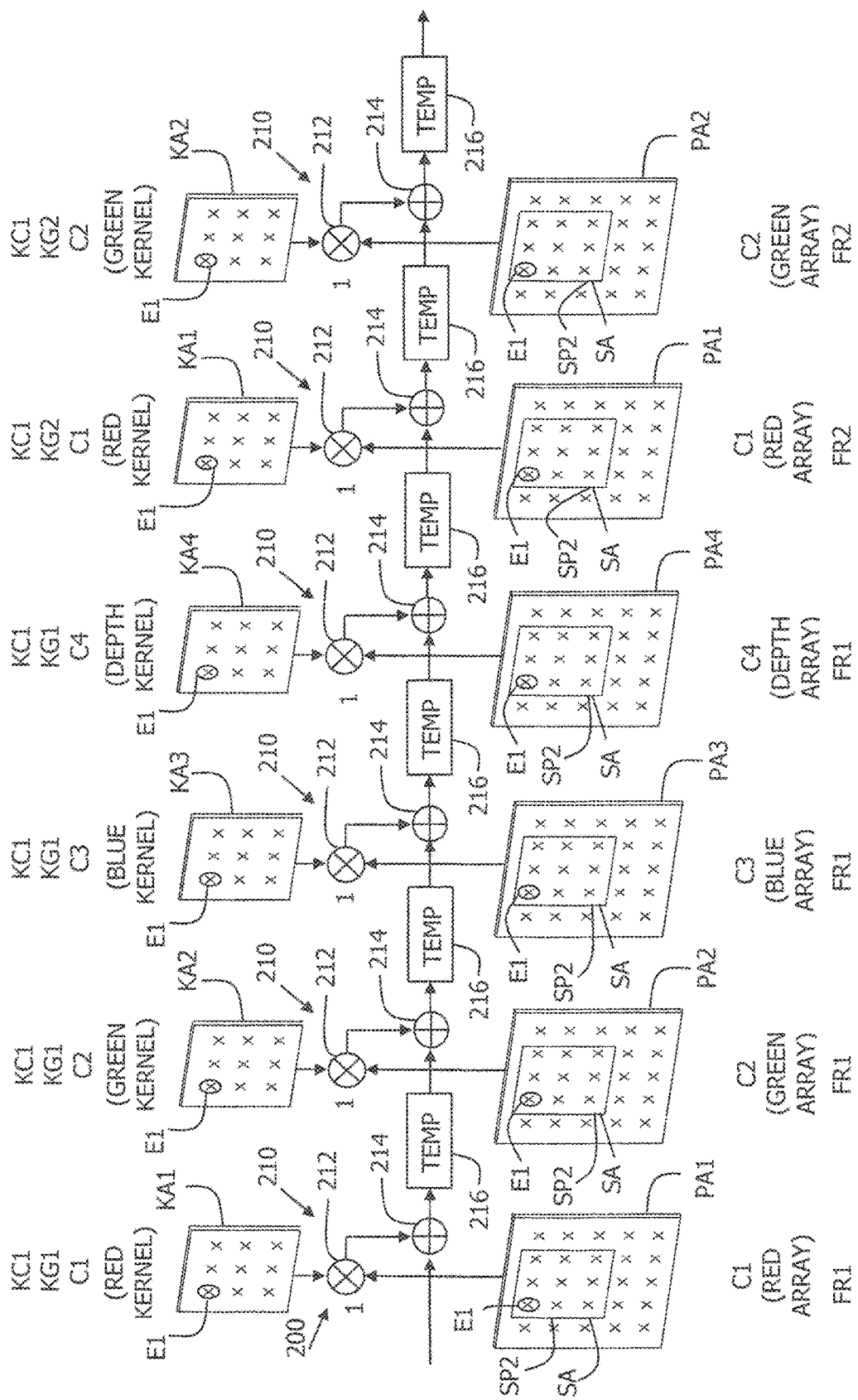
Figure 2E:
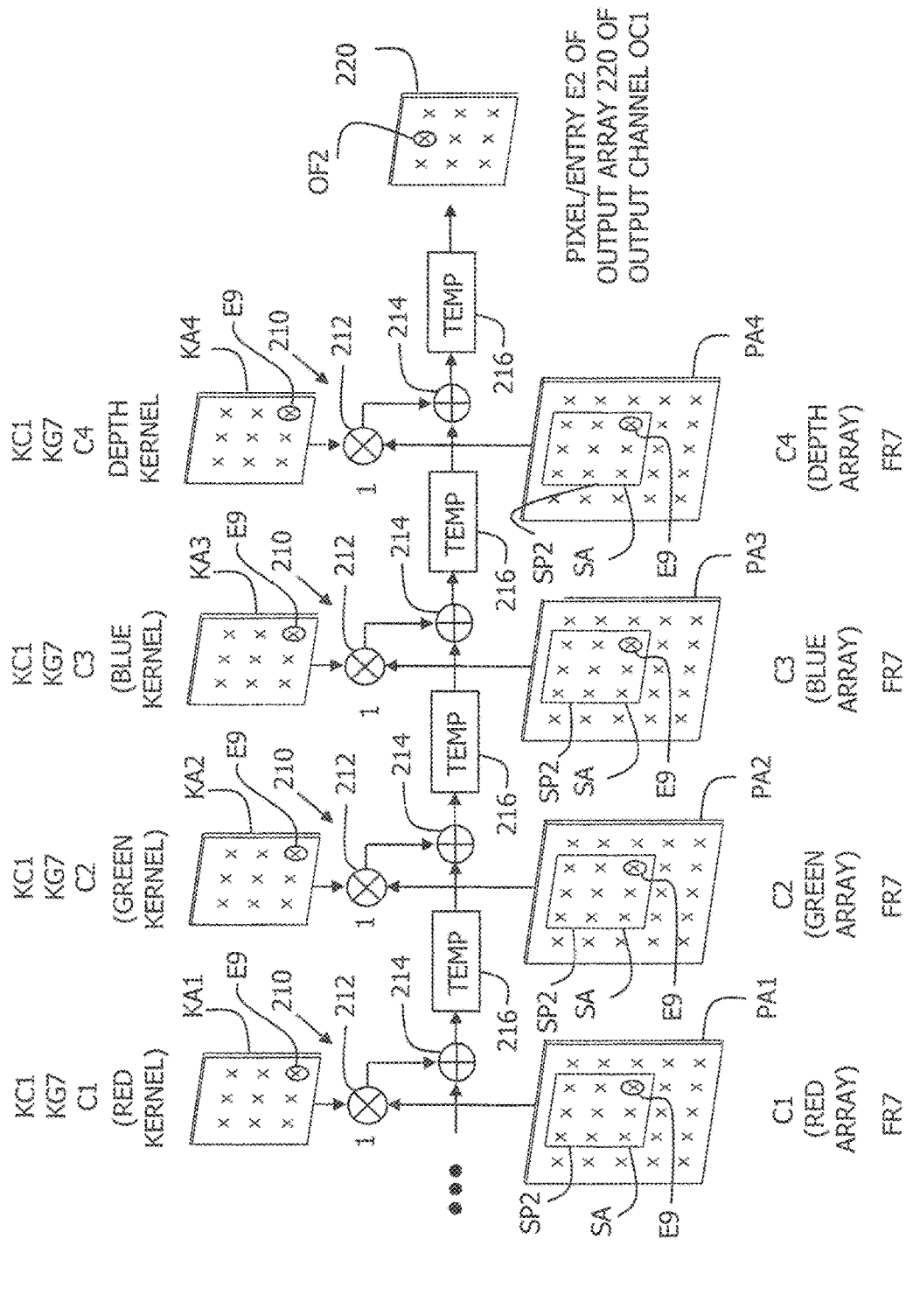
Figure 2F:
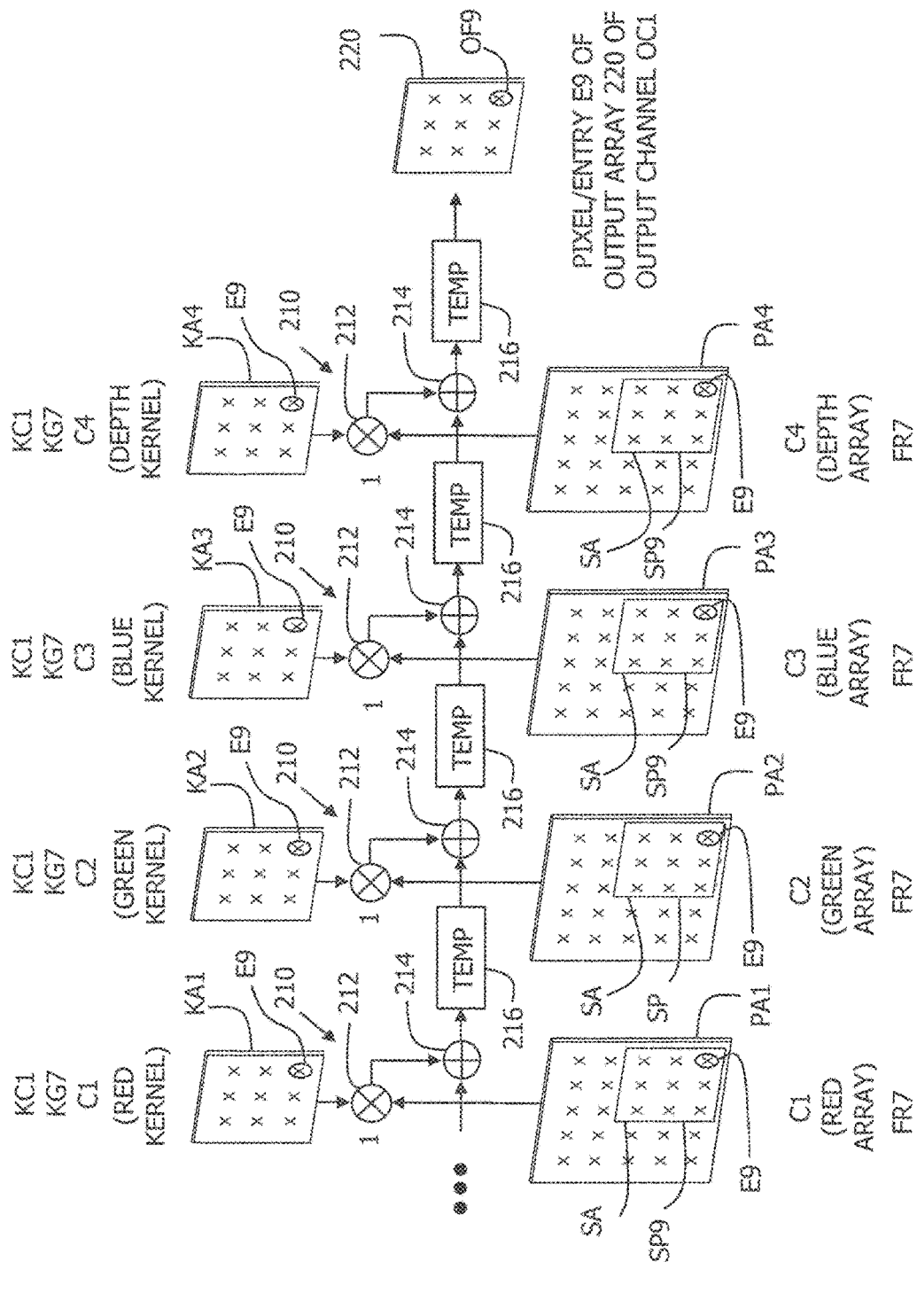
Figure 2G:
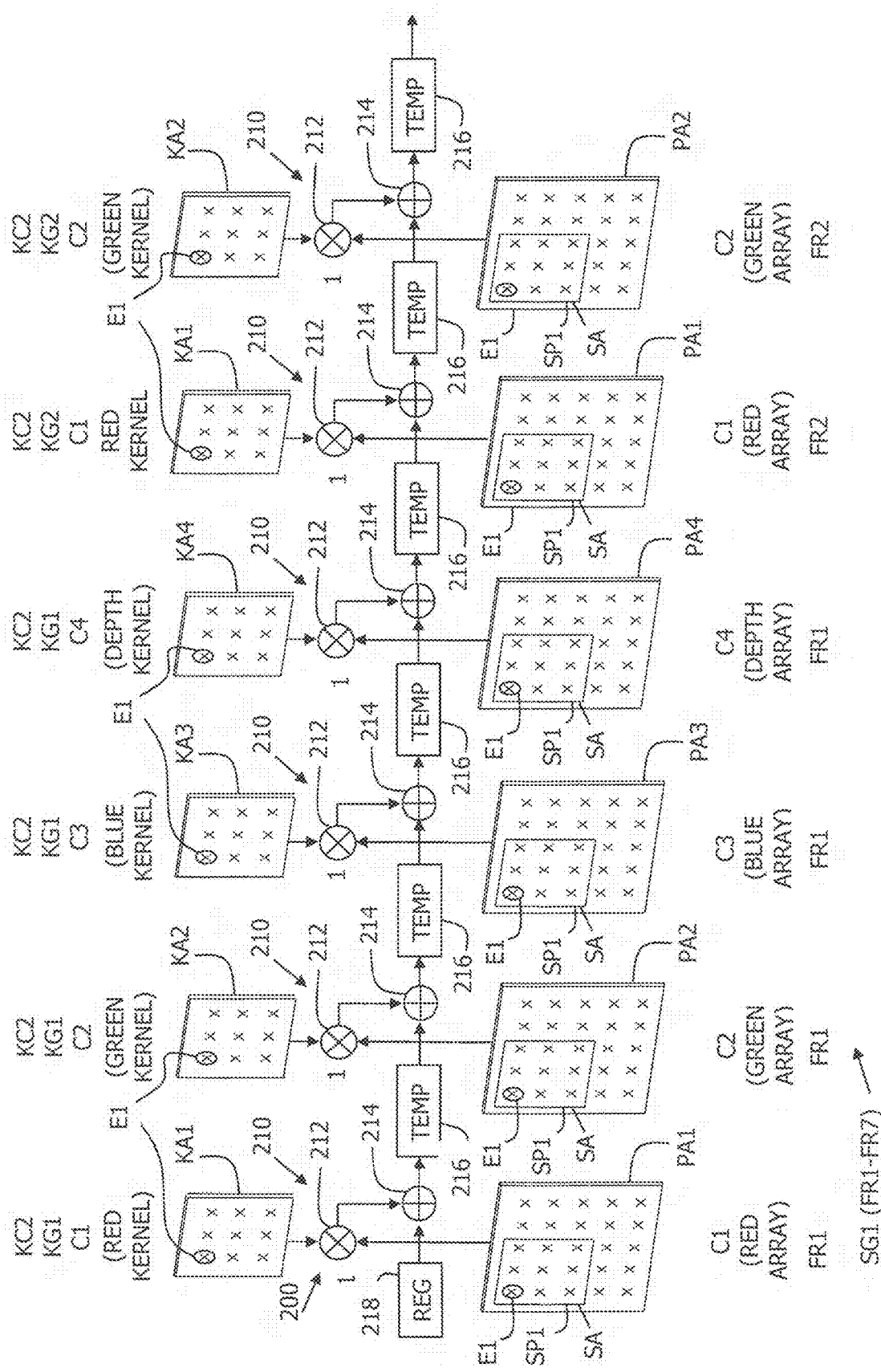
Figure 2H:
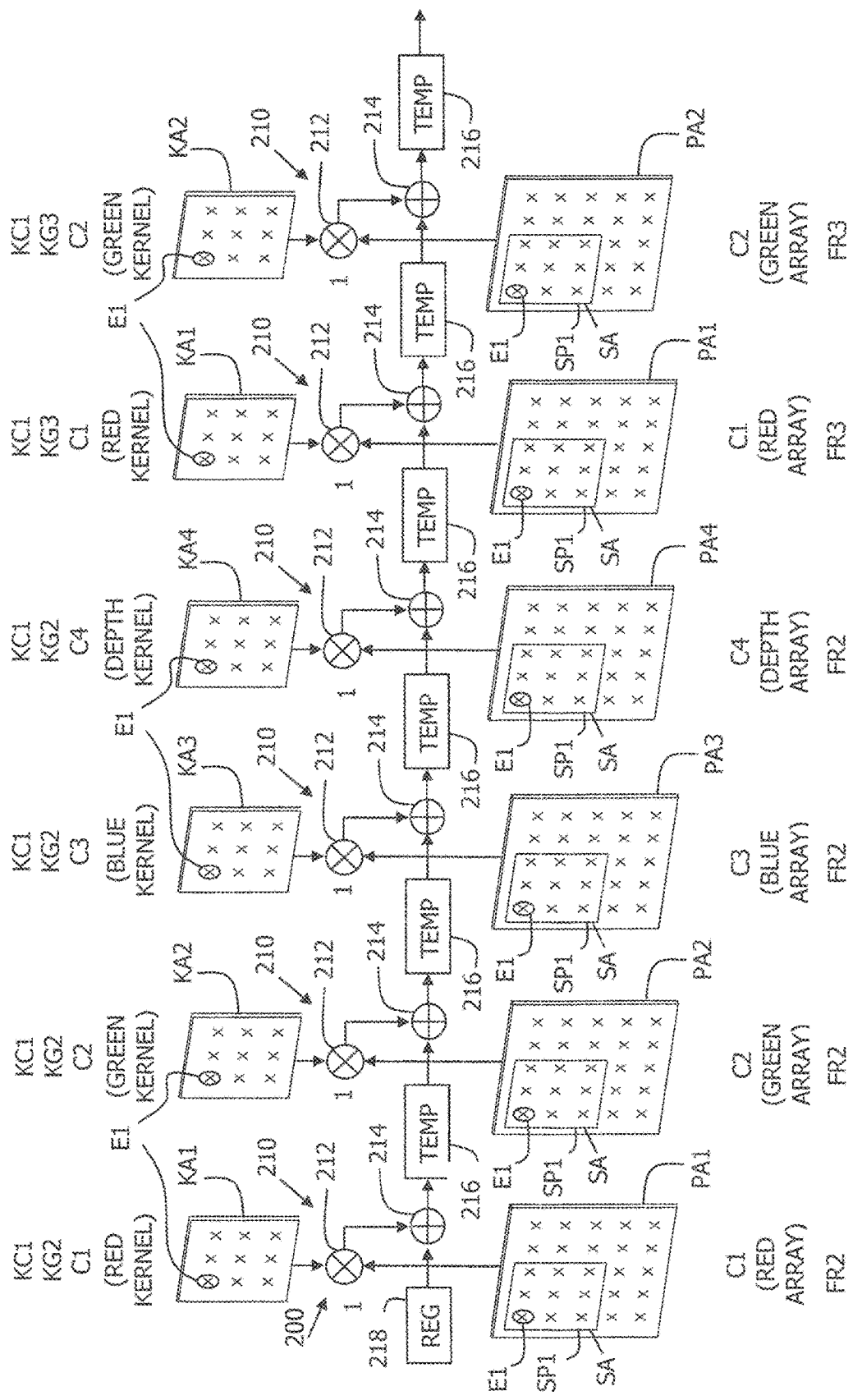
Figure 3A:
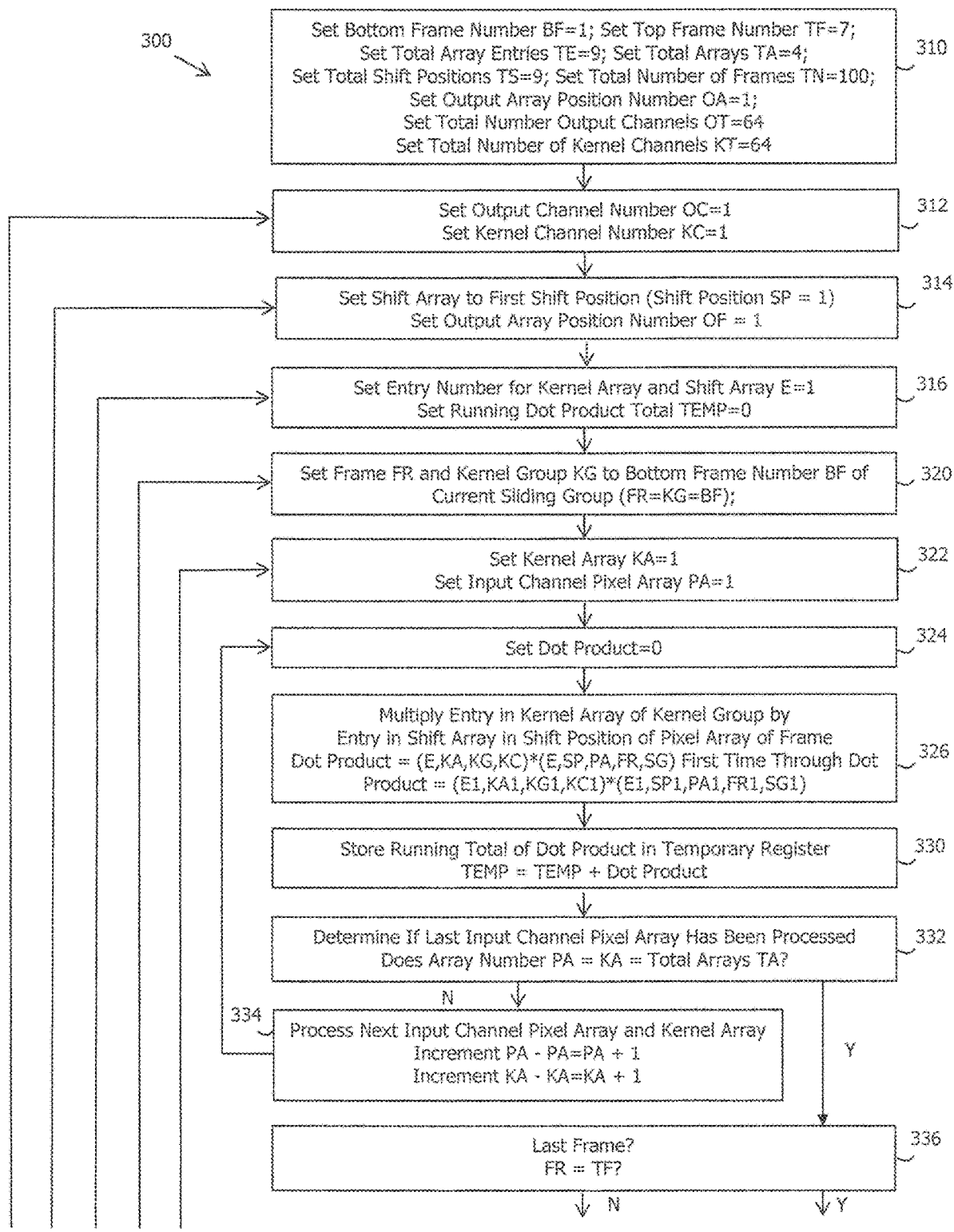
FIGS. 3A-3B are a flow chart illustrating an example of a method 300 of operating a 2D convolutional accelerator to obtain a 3D result in accordance with the present invention.
Figure 3B:
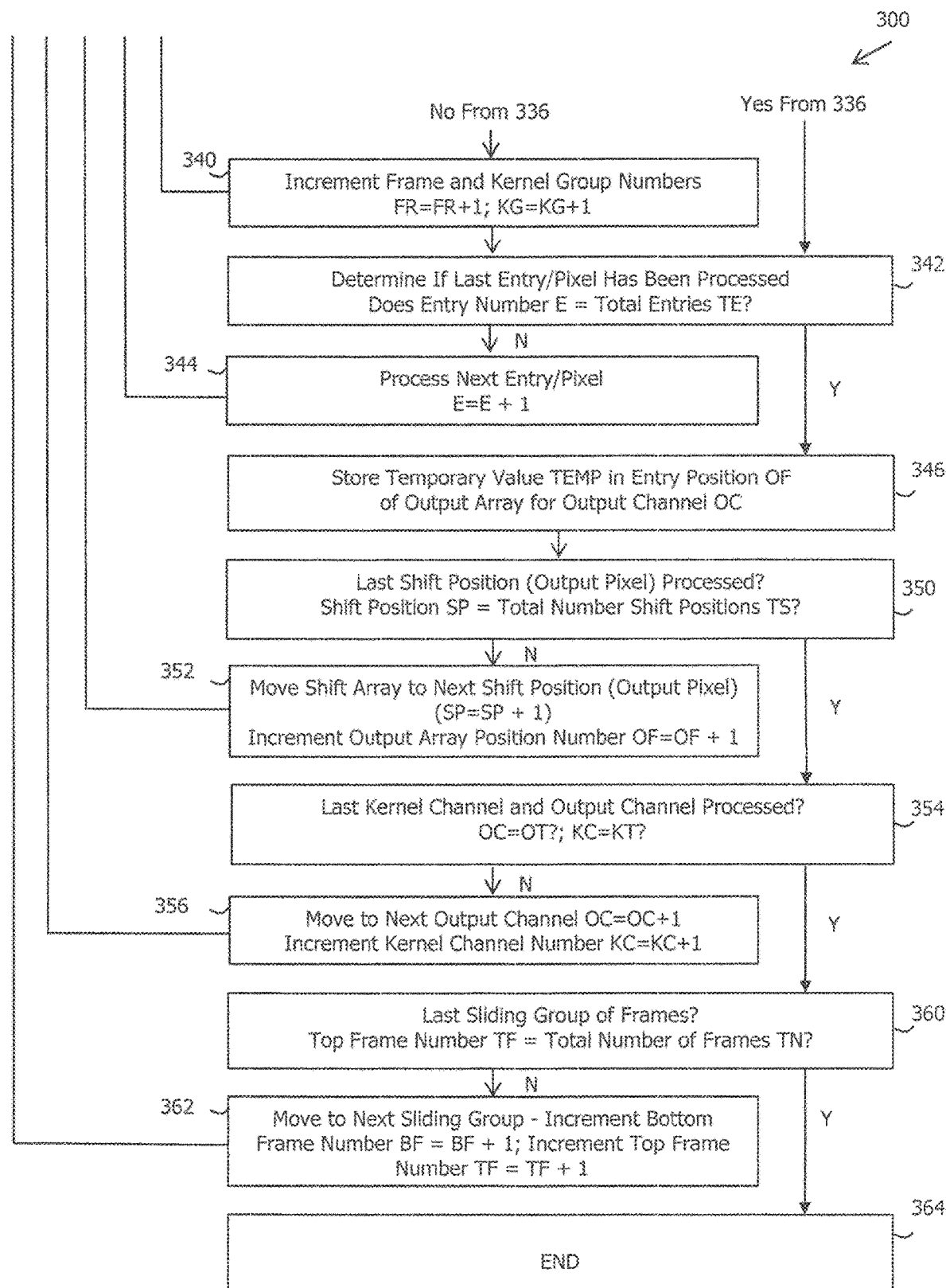

FIGS. 3A-3B show a flow chart that illustrates an example of a method 300 of operating a 2D convolutional accelerator to obtain a 3D result in accordance with the present invention. Method 300 is illustrated as a number of steps with reference to FIGS. 2A-2H, with each step having a textual description of the step and a corresponding exemplary pseudocode to further illustrate the operation of method 300.

As shown in FIG. 3A, method 300 begins at step 310 by setting a number of initial conditions. In the present example, step 310 sets the bottom frame number BF=1 and the top frame number TF=7 of a sliding group that has seven frames. Each frame of the sliding group, in turn, has a total number of input channels (pixel arrays) TA=4.

In addition, in the present example, step 310 also sets the total number of pixels/entries in the kernel and shift arrays TE=9, the total number of shift positions TS=9 that a shift array SA can be moved within a pixel array, the total number of frames being processed TN=100, the total number of kernel channels KC=64, and the total number of output channels OT=64.

Following this, method 300 moves through the next six steps 312, 314, 316, 320, 322, and 324 to set the initial conditions for six corresponding loops. In step 312, method 300 sets a first kernel channel number (KC=1) and a first output channel number (OC=1), and in step 314 sets the shift array SA into a first shift position (SP=1), and an output array entry number (OF=1). Further, step 316 sets the pixel/entry number for the kernel and shift arrays to one (E=1), and sets a running dot product total to zero (TEMP=0).

In step 320, method 300 sets the frame to the bottom frame number (FR=BF), and the kernel group to the bottom frame number (KG=BF). In step 322, method 300 sets the C1 kernel array (KA=1 (red)) and the C1 pixel array (PA=1 (red)). In step 324, method 300 sets a dot product to zero (Dot Product=0).

After this, method 300 moves to step 326 where, as illustrated in FIG. 2A, the pixel/entry position (E1) in the C1 kernel array (KA1 (red)) of the kernel group (KG1) in the kernel channel (KC1) and the pixel/entry (E1) in the shift array (SA) in the shift position (SP1) in the C1 pixel array (PA1 (red)) of the frame (FR1) in the sliding group (SG1) are multiplied together by multiplier 212 to obtain a current dot product (Dot Product=(E,KA,KG,KC)*(E,SP,PA,FR,SG).

After this, method 300 moves to step 330 where the current dot product and a previous dot product (which is initially zero in register 218) are added together by adder 214 to generate the running dot product total TEMP (TEMP=TEMP+Dot Product). The running dot product total TEMP is then stored in a temporary register 216.

Following this, method 300 moves to step 332 to determine if the last input channel (C4 pixel array PA4 (depth)) has been processed by comparing the array number (PA) to the total number of arrays (PA=TA?). When the last input channel (C4 pixel array PA4 (depth)) has not been processed, method 300 loops back to process the next input channel ((C2 pixel array PA2 (green)) by incrementing the kernel array number (KA=KA+1) and the pixel array number (PA=PA+1) in step 334, and then returning to step 324 to set the dot product to zero (Dot Product=0).

Method 300 next moves to step 326. In step 326, as further shown in FIG. 2A, method 300 next multiplies together the pixel/entry (E1) in the C2 kernel array (KA2 (green)) of the kernel group (KG1) and the pixel/entry (E1) in the shift array (SA) in the shift position (SP1) in the C2 pixel array (PA2 (green)) of the frame (FR1) to obtain a current dot product (Dot Product).

After this, method 300 moves to step 330 where the current dot product (of entry E1, shift position SP1, C2 pixel array PA2 of frame FR1 at this point) and a previous running dot product total (of entry E1, shift position SP1, C1 pixel array PA1 of frame FR1 at this point) are combined by adder 214 to update the running dot product total TEMP, which is stored in a temporary register 216. Following this, method 300 moves to step 332 to determine if the last input channel (depth array PA4) has been processed (PA=TA?).

Method 300 continues to loop until the last input channel (C4 pixel array PA4 (depth)) has been processed. When the last input channel (C4 pixel array PA4 (depth)) has been processed in step 332, method 300 moves to step 336 to determine if the last frame has been processed (FR=TF?). When the last frame (FR7 at this point) has not been processed, method 300 loops back to process the next frame by incrementing the frame and kernel group numbers (FR=FR+1; KG=KG+1) in step 340, and returning to step 322 to again set the loop conditions. As shown in FIG. 2A, after the last input channel (C4 pixel array PA4 (depth)) of frame FR1 has been processed, the first input channel C1 pixel array PA1 (red) of frame FR2 is next to be processed.

Method 300 continues to loop until the last frame (FR=TF) has been processed. When the last frame (FR=TF) has been processed in step 336, method 300 moves to step 342 to determine if the last pixel/entry (E9) has been processed (E=TE?). When the last pixel/entry (E9) has not been processed, method 300 loops back to process the next pixel/entry by increasing the pixel/entry number (E=E+1) in step 344, and returning to step 322 to again set the loop conditions. As shown in FIG. 2B, after the first entry E1 of the C4 pixel array PA4 (depth) of frame FR7 has been processed, the second entry E2 in the C1 pixel array PA1 (red) of frame FR1 is next to be processed.

Method 300 continues to loop until the last entry (E=TE=9) has been processed. When the last entry (E=TE) in the shift array SA of shift position SP1 of the last input channel (C4 pixel array PA4 (depth)) has been processed in step 342, method 300 moves to step 346 to store the running dot product total TEMP in the first entry OF1 of an output array 220/feature map of a first output channel OC1. As shown in FIG. 2C, after the last entry E9 of the last input channel (C4 pixel array PA4 (depth)) of frame FR7 has been processed, the running dot product total TEMP is stored in the first entry OF1 (the first column of the first row) in the output array 220 of the first output channel OC1.

Following this, method 300 moves to step 350 to determine if the last shift position has been processed (SP=TS?). When the last shift position (SP=TS=9) has not been processed, method 300 loops back to process the next shift position (SP) by incrementing the shift position (SP=SP+1) and the output array position number (OF=OF+1) in step 352 and returning to steps 316, 320, 322, and 324 to again set the initial loop conditions. As shown in FIG. 2D, after the last entry E9 of the C4 pixel array PA4 (depth) of frame FR7 of the first shift position SP1 has been processed, the first entry E1 of the C1 pixel array PA1 (red) of frame FR1 of the second shift position SP2 is next to be processed.

Method 300 continues to loop until the last pixel/entry (E=TE=9) in the shift array in the second shift position SP2 in the C4 pixel array PA4 (depth) has been processed. When the last entry (E=TE) in the shift array SA of shift position SP2 of the last pixel array PA4 (depth) has been processed in step 342, method 300 moves to step 346 to store the running dot product total TEMP in the second entry OF2 of the output array 220 (feature map) of the first output channel OC1. As shown in FIG. 2E, after the last entry E9 of the C4 pixel array PA4 (depth) of frame FR7 of the second shift position SP2 has been processed, the running dot product total TEMP is stored in the second entry OF2 in the output array 220 of output channel OC1.

Method 300 continues to loop until the last entry (E=TE=9) in the shift array in the last shift position SP9 in the C4 pixel array PA4 (depth) has been processed. When the last entry (E=TE) in the shift array SA of the last shift position SP9 of the last pixel array PA4 (depth) has been processed in step 342, method 300 moves to step 346 to store the running dot product total TEMP in the ninth entry OF9 of the output array 220 (feature map), which completes the 3×3 array of the first output channel OC1. As shown in FIG. 2F, after the last entry E9 of the last input channel (C4 pixel array PA4 (depth)) of frame FR7 of the last shift position SP9 has been processed, the running dot product total TEMP is stored in the ninth entry OF9 in the output array 220 of output channel OC1.

After the last shift position SP9 has been processed in step 350, method 300 moves to step 354 to determine if the last output channel has been processed (OC=OT?). When the last output channel has not been processed, method 300 loops back to process the next output channel by incrementing the output channel number (OC=OC+1) and the kernel channel number (KC=KC+1) in step 356, and returning to step 314.

As shown in FIG. 2G, after the running dot product total TEMP has been stored in the ninth entry OF9 in the output array 220 of output channel OC1, output channel OC2 is next processed beginning with the first entry E1 of the C1 (red) kernel array KA1 in kernel group KG1, and the first entry E1 in the shift array SA in the first shift position SP1 in the C1 (red) pixel array PA1 of frame FR1 of sliding group SG1.

When the last output channel has been processed, method 300 moves to step 360 to determine if the last sliding group has been processed (TF=TN?). When the last sliding group (TF=TN=100) has not been processed, method 300 loops back to process the next sliding group (SG2=FR2–FR8) by incrementing the bottom frame number (BF=BF+1) and the top frame number (TF=TF+1) in step 360, and returning to step 312.

As shown in FIG. 2H, after the last entry E9 of the C4 pixel array PA4 (depth) of frame FR7 of the last shift position SP9 has been processed and the running dot product total TEMP has been stored in the ninth entry OF9 in the output array 220 of sliding group SG1, the first entry E1 of the shift array SA in the first shift position SP1 in the C1 pixel array PA1 (red) of frame FR2 of sliding group SG2 (FR2-FR8) is next to be processed.

Method 300 continues to loop until a 3×3 output array (feature map) has been generated in each of 64 output channels in each of 94 output frames (3×3×64×94). In a CNN, the convolution of method 300 is performed in a number of layers. The output from the first convolutional layer (3×3×64×94) then becomes the input to a next convolutional layer where there are 94 input frames with each input frame having 64 input channels with each input channel having a 3×3 array (feature map).

In addition, each time method 300 is performed in a convolutional layer, different numbers of sliding groups and kernel channels can be utilized. For example, if the next method 300 convolution looks at a nine-frame sliding group window (SG1-SG86-FR1-FR9, FR2-FR10), uses 2×2 kernel arrays, and has 128 kernel channels, then the final result will be a 2×2 array in each of 128 output channels in each of 86 output frames (2×2×128×86). This then becomes in input to the next method 300 convolution.

Thus, at the end of a first or input convolutional layer, method 300 generates 94 output frames where each output frame has 64 output channels that each have an output array/feature map. The 64 output arrays/features maps in an output frame, in turn, define a feature cube. As a result, 94 feature cubes are input to the next method 300 convolutional layer. In the present discussion, a number of common CNN steps, such as padding, have not been described for purposes of simplicity.

Figure 4:
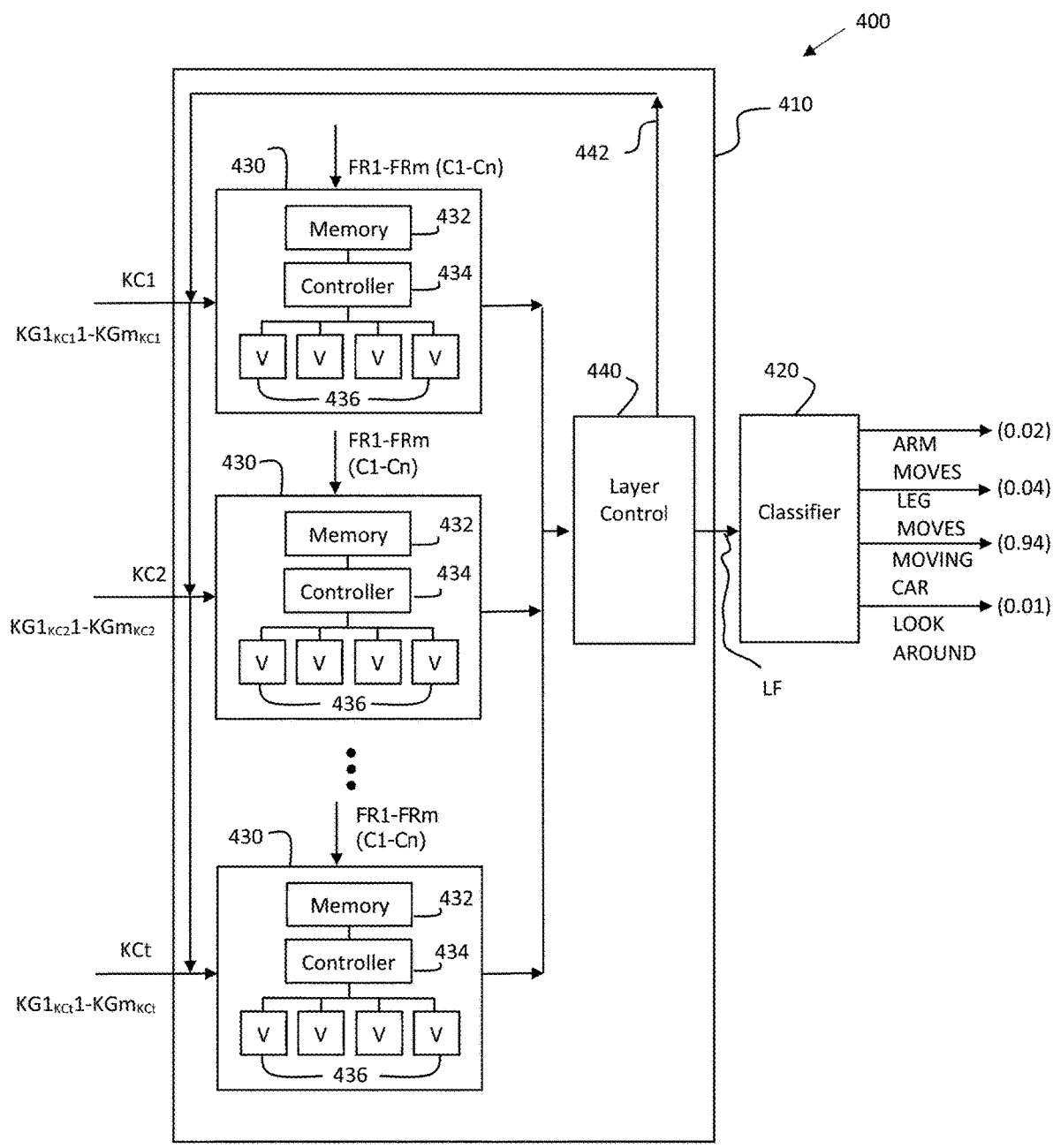
FIG. 4 is a block diagram illustrating an example of a CNN 400 in accordance with the present invention.

FIG. 4 shows a block diagram that illustrates an example of a CNN 400 in accordance with the present invention. As shown in FIG. 4, CNN 400 includes a computing system 410 that convolves a series of input frames FR1-FRm and a series of kernel channels KC1-KCt in each of a series of convolutional stages or layers to generate a last output frame LF. The last output frame LF has a last output channel which, in turn, has a last array (e.g., a 1×1 feature vector).

Each of the input frames FR1-FRm has a matching sequence of input channel pixel arrays C1-Cn. The pixel arrays C1-Cn include a shift array that has a number of shift positions within the pixel arrays C1-Cn. Each of the kernel channels KC1-KCt includes a series of kernel groups KG1-KGm that correspond with the series of input frames FR1-FRm. Each kernel group has a matching sequence of kernel arrays that corresponds with the sequence of pixel arrays.

As further shown in FIG. 4, CNN 400 includes a classifier 420 that is coupled to computing system 410. Classifier 420, which is conventional, generates a number of labels with probabilities based on the last array (1×1 feature vector) of the last channel of the last output frame. Classifier 420 performs matrix multiplications to generate the number of labels with probability values in response to the last array.

For example, classifier 420 can generate the following labels and probabilities: a moving arm with a 0.02 probability, a moving leg with a 0.04 probability, a moving car with a 0.94 probability, and a looking around movement with a 0.01 probability, and output the label with the highest probability (moving car) as a detected action pattern.

As also shown in FIG. 4, computing system 410 includes a number of core processors 430. In each convolutional layer, the core processors 430 receive different numbers of input frames and can receive different numbers of kernel channels. For example, in a first or input convolutional layer, the core processors 430 could receive 100 input frames (FR1-FR100) and 64 kernel channels (KC1-KC64), while in a second or next convolutional layer, the core processors 430 could receive 94 input frames (FR1-FR94) and 128 kernel channels (KC1-KC128).

In addition, the core processors 430 in each convolutional layer determine a number of sliding groups from the input frames FR1-FRm where each sliding group has a number of input frames FR. Further, in each convolutional layer, the core processors 430 convolve the input frames in the sliding groups with the kernel groups in the kernel channels to generate a number of output frames that correspond with the number of sliding groups such that the input frames in a sliding group and the kernel groups in the kernel channels are convolved to generate an output frame that corresponds with the sliding group.

As further shown in FIG. 4, each core processor 430 can include a memory 432 that stores instructions along with a number of arrays, such as the pixel arrays, the kernel arrays, and the output arrays/frame maps. Each core processor 430 can also include a controller 434 that is coupled to memory 432 to receive the series of frames FR1-FRm and the series of kernel channels KC1-KCt, and generate the output arrays/feature maps of the output channels of the output frames. Each input frame has a number of pixel arrays that correspond with a number of kernel arrays in each kernel group. The pixel and kernel arrays have sizes.

Controller 434 also determines a shift array and a number of shift positions of the shift array within the pixel arrays based on the pixel and kernel array sizes. The shift array has a number of entries. The number of shift positions has a corresponding number of entries in an output array such that each shift position has a corresponding entry in the output array. Controller 434 further determines a number of sliding groups from the series of frames where each sliding frame group has a number of frames. Controller 434 obtains information from and stores information in memory 432.

Each core processor 430 further includes a number of convolvers 436, such as convolvers 210, that are coupled to controller 434 to receive information from and provide information to controller 434. The convolvers 436, which can be implemented in logic, perform the dot product multiplication, summing, and temporary storing operations of method 300 to generate a running dot product total. The convolvers 436 in a core processor 430 determine a running dot product total for each shift position of the plurality of shift positions of the shift array in the pixel arrays of the input frames in a sliding group, while the controller 434 generates the output array that corresponds with the sliding group by assigning the running dot product total for each shift position to a corresponding entry in the output array.

In addition, the convolvers 436 determine a running dot product total for all of the entries in the shift array in a shift position in the pixel arrays in the frames in the sliding group, and determine a running dot product total for the shift position from the running dot product total for all of the entries in the shift array in the shift position in the pixel arrays in the frames of the sliding group.

Further, the convolvers 436 determine, frame by frame for the frames in the sliding group, a running dot product total for an entry in the shift array in the shift position in each pixel array in a frame. The convolvers 436 also determine the running dot product total for all of the entries in the shift array in the shift position in the pixel arrays in the frames of the sliding group from the running dot product total for each entry in the shift array in the shift position in each pixel array in each frame in the sliding group.

There are many opportunities for parallel processing with respect to the execution of method 300. For example, 64 kernel channels can be processed in parallel with 64 core processors. Alternately, two cycles can be used to process 64 kernel channels with 32 core processors, or two cycles can be used to process 128 kernel channels with 64 core processors.

Further, as illustrated in the FIG. 4 example, four convolvers 436 can generate the running dot product total for an entry in each of the four C1-C4 pixel arrays in a frame (e.g., steps 324-336) substantially in parallel. In addition, when performing parallel kernel channel processing, method steps 354 and 356 of method 300 can be omitted as each of the 64 kernel/output channels are processed at substantially the same time.

As additionally shown in FIG. 4, computing system 410 also includes a layer controller 440 that converts the output frames into input frames to the next convolutional layer by way of feedback loop 442. Each output frame has a number of output channels that forms the input channels of the next convolution layer, and each output channel has an output array that forms a channel pixel array of the next convolutional layer. Layer controller 420 converts the output frames into input frames until a last convolutional layer outputs the last frame LF with the last channel and the last array (1×1 feature vector).

Layer controller 440 performs a number of conventional functions, including non-linear activation, local pooling, global pooling, and batch normalization. For example, non-linear activation, which can be implemented as an ReLU layer, generates non-linear output arrays in response to the output arrays/feature maps generated by a convolution by replacing each negative pixel value (element in the array) in each output array/feature map with a value of zero.

Local pooling generates a number of pooled output arrays in response to the non-linear output arrays by down sampling the non-linear output arrays to reduce the dimensionality of the arrays. For example, a 14×14 array can be down sampled to form a 7×7 array using maximum, average, sum, or other pooling approaches. Global pooling reduces the feature map to a 1×1 feature vector.

Figure 5A:
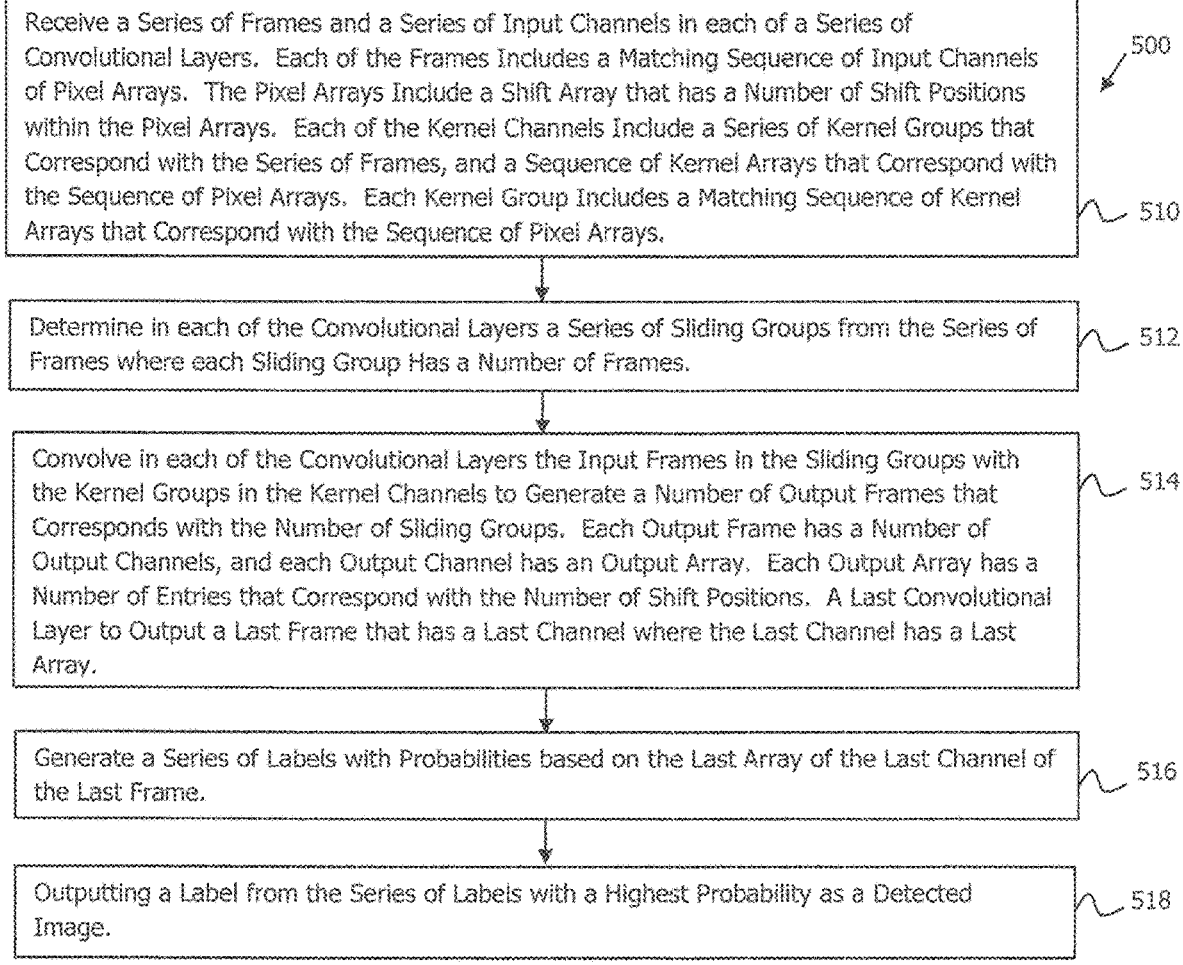
FIG. 5A is a flow chart illustrating an example of a method 500 of operating an accelerator in accordance with the present invention.

FIG. 5A shows a flow chart that illustrates an example of a method 500 of operating a convolutional accelerator in accordance with the present invention. As shown in FIG. 5A, method 500 begins at step 510 by receiving a series of input frames and a series of kernel channels in each of a series of convolutional layers. For example, method 500 can receive 100 input frames (FR1-FR100) and 64 kernel channels (KC1-KC64) in a first or input convolutional layer.

Each of the frames includes a matching sequence of input channels of pixel arrays. The pixel arrays include a shift array that has a number of shift positions within the pixel arrays. Each of the kernel channels, in turn, includes a series of kernel groups that correspond with the series of frames. In addition, each kernel group includes a matching sequence of kernel arrays that correspond with the sequence of pixel arrays.

Following this, method 500 moves to step 512 to determine in each of the convolutional layers a series of sliding groups of frames from the series of frames where each sliding group has a number of frames. For example, a series of 100 frames (FR1-FR100) can be broken into 94 sliding groups of frames where each sliding group of frames has seven frames.

Next, method 500 moves to step 514 to convolve in each of the convolutional layers the input frames in the sliding groups with the kernel groups in the kernel channels to generate a number of output frames that correspond with the number of sliding groups such that the input frames in a sliding group and the kernel groups in the kernel channels are convolved to generate an output frame that corresponds with the sliding group. Each output frame has a number of output channels, while each output channel has an output array. Each output array, in turn, has a number of entries that correspond with the plurality of shift positions. Further, a last convolutional layer outputs a last frame that has a last channel where the last channel has a last array.

Next, method 500 moves to step 516 to generate a series of labels with probabilities based on the last array of the last channel of the last frame. For example, step 516 can generate the following labels and probabilities: a dog with a 0.02 probability, a cat with a 0.04 probability, a moving car with a 0.94 probability, and a tree with a 0.01 probability. Following this, method 500 moves to step 518 to output the label with a highest probability as a detected image.

Figure 5B:
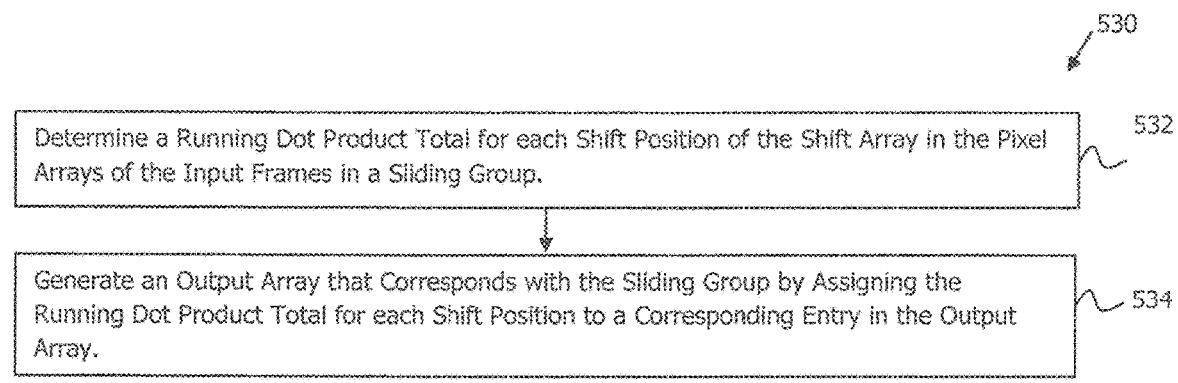
FIG. 5B is a flow chart illustrating an example of a method 530 of convolving the input frames in the sliding groups with the kernel groups in the plurality of kernel channels in accordance with the present invention.

FIG. 5B shows a flow chart that illustrates an example of a method 530 of convolving the input frames in the sliding groups with the kernel groups in the plurality of kernel channels in accordance with the present invention. As shown in FIG. 5B, method 530 begins at step 532 by determining a running dot product total for each shift position of the shift array in the pixel arrays of the input frames in a sliding group. Following this, method 500 moves to step 534 to generate an output array/feature map that corresponds with the sliding group by assigning the running dot product total for each shift position to a corresponding entry in the output array.

Figure 5C:
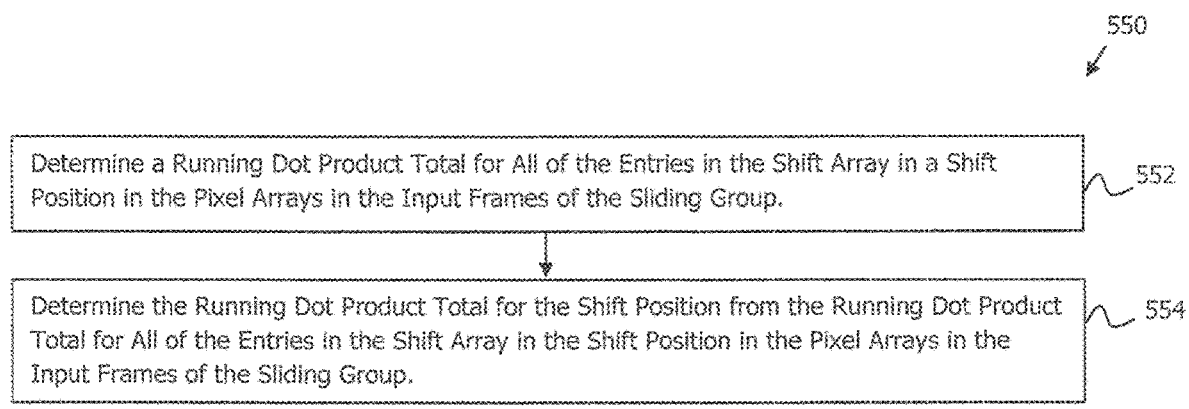
FIG. 5C is a flow chart illustrating an example of a method 550 of determining a running dot product total for each shift position of the shift array in accordance with the present invention.

FIG. 5C shows a flow chart that illustrates an example of a method 550 of determining a running dot product total for each shift position of the shift array in accordance with the present invention. As shown in FIG. 5C, method 550 begins at step 552 by determining a running dot product total for all of the entries in the shift array in a shift position in the pixel arrays in the input frames in the sliding group. After this, method 550 moves to step 554 to determine the running dot product total for the shift position from the running dot product total for all of the entries in the shift array in the shift position in the pixel arrays in the input frames of the sliding group.

Figure 5D:
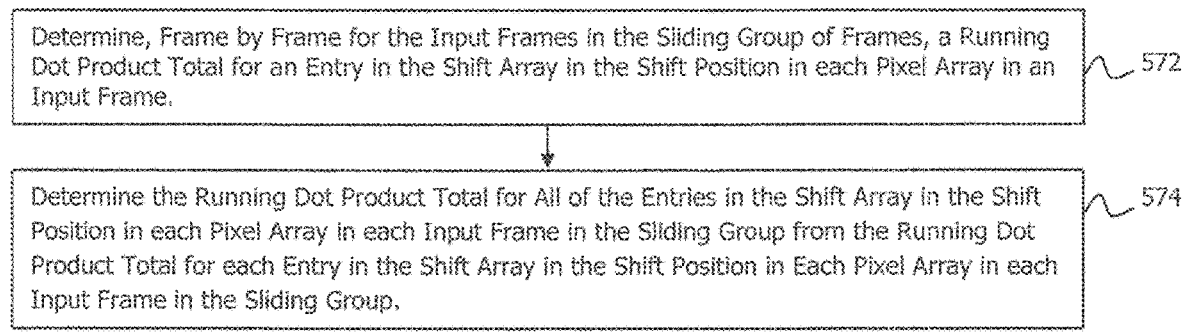
FIG. 5D is a flow chart illustrating an example of a method 570 of determining a running dot product total for all of the entries in the shift array in the shift position in accordance with the present invention.

FIG. 5D shows a flow chart that illustrates an example of a method 570 of determining a running dot product total for all of the entries in the shift array in the shift position in accordance with the present invention. As shown in FIG. 5D, method 570 begins at step 572 by determining, frame by frame for the input frames in the sliding group, a running dot product total for an entry in the shift array in the shift position in each pixel array in an input frame. Next, method 570 moves to step 574 to determine the running dot product total for all of the entries in the shift array in the shift position in each pixel array in each input frame in the sliding group from the running dot product total for each entry in the shift array in the shift position in each pixel array in each input frame in the sliding group.

One of the advantages of the present invention is that the present invention can provide three-dimensional results using existing two-dimensional convolutional accelerators. This is a significant savings in both hardware development time and the amount of actual hardware used in hardware-based 3D convolutional accelerators. As a result, three-dimensional results can be obtained without the cost and time required to produce hardware-based three-dimensional convolution accelerators.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium.

Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A method of operating a convolutional accelerator, the method comprising:
   receiving a plurality of input frames and a plurality of kernel channels in each of a plurality of convolutional layers, each of the input frames having a matching sequence of input channels of pixel arrays, the pixel arrays including a shift array that has a plurality of shift positions within the pixel arrays, each of the kernel channels including a plurality of kernel groups that correspond with the plurality of input frames, each kernel group having a matching sequence of kernel arrays that correspond with the sequence of pixel arrays of the input frame which corresponds to the kernel group;
   determining in each convolutional layer a number of sliding groups from the plurality of input frames where each sliding group has a number of the input frames;
   convolving in each convolutional layer the input frames in the sliding groups with the kernel groups in the plurality of kernel channels to generate a number of output frames that correspond with the number of sliding groups, each output frame having a number of output channels, each output channel having an output array, each output array having a number of entries that correspond with the plurality of shift positions of the shift array within the pixel arrays of the input frames, a last convolutional layer of the plurality of convolutional layers to output a last frame of the number of output frames, the last frame having a last channel of the number of output channels, the last channel having a last output array;
   generating a plurality of labels with probabilities based on the last array of the last channel of the last frame; and
   outputting the label with a highest probability as a detected action pattern.

2. The method of claim 1 wherein convolving includes:
   determining a running dot product total for each shift position of the plurality of shift positions of the shift array in the pixel arrays of the input frames in a sliding group of the sliding groups; and generating the output array that corresponds with the sliding group by assigning the running dot product total for each shift position to a corresponding entry in the output array.

3. The method of claim 2 wherein determining a running dot product total for each shift position of the shift array includes:
   determining a running dot product total for all of the entries in the shift array in a shift position of the plurality of shift positions within the pixel arrays in the input frames in the sliding group; and
   determining a running dot product total for the shift position from the running dot product total for all of the entries in the shift array in the shift position in the pixel arrays in the input frames of the sliding group.

4. The method of claim 3 wherein determining a running dot product total for all of the entries in the shift array in the shift position in the pixel arrays in the input frames in the sliding group includes:
   determining, frame by frame for the input frames in the sliding group, a running dot product total for an entry in the shift array in the shift position in each pixel array in an input frame; and
   determining the running dot product total for all of the entries in the shift array in the shift position in the pixel arrays in the input frames of the sliding group from the running dot product total for each entry in the shift array in the shift position in each pixel array in each input frame in the sliding group.

5. The method of claim 4 wherein the input channels of pixel arrays include a red array, a green array, a blue array, and a depth array.

6. The method of claim 4 wherein the kernel arrays include a red array, a green array, a blue array, and a depth array.

7. The method of claim 6 wherein a shift array size is defined by a kernel array size.

8. A two-dimensional convolutional accelerator comprising:
   a computing system having a plurality of core processors, the core processors to:
      receive a plurality of input frames and a plurality of kernel channels in each of a plurality of convolutional layers, each of the input frames having a matching sequence of input channels of pixel arrays, the pixel arrays including a shift array that has a plurality of shift positions within the pixel arrays, each of the kernel channels including a plurality of kernel groups that correspond with the plurality of input frames, each kernel group having a matching sequence of kernel arrays that correspond with the sequence of pixel arrays of the input frame which corresponds to the kernel group;
      determine in each convolutional layer a number of sliding groups from the plurality of input frames where each sliding group has a number of the input frames; and
      convolve in each convolutional layer the input frames in the sliding groups with the kernel groups in the plurality of kernel channels to generate a number of output frames that correspond with the number of sliding groups, each output frame having a number of output channels, each output channel having an output array, each output array having a number of entries that correspond with the plurality of shift positions of the shift array within the pixel arrays of the input frames, a last convolutional layer of the plurality of convolutional layers to output a last frame of the number of output frames, the last frame having a last channel of the number of output channels, the last channel having a last output array; and
   a classifier coupled to the computing system, the classifier to:
      generate a list of labels with probabilities based on the last array in the last channel of the last frame; and
      output a label with a highest probability as a detected action pattern.

9. The accelerator of claim 8 wherein convolving the input frames includes:
   determining a running dot product total for each shift position of the plurality of shift positions of the shift array in the pixel arrays of the input frames in a sliding group of the sliding groups; and
   generating the output array that corresponds with the sliding group by assigning the running dot product total for each shift position to a corresponding entry in the output array.

10. The accelerator of claim 9 wherein determining a running dot product total for each shift position of the shift array includes:
   determining a running dot product total for all of the entries in the shift array in a shift position of the plurality of shift positions within the pixel arrays in the input frames in the sliding group; and
   determining a running dot product total for the shift position from the running dot product total for all of the entries in the shift array in the shift position in the pixel arrays in the input frames of the sliding group.

11. The accelerator of claim 10 wherein determining a running dot product total for all of the entries in the shift array in the shift position in the pixel arrays in the input frames in the sliding group includes:
   determining, frame by frame for the frames in the sliding group, a running dot product total for an entry in the shift array in the shift position in each pixel array in an input frame; and
   determining the running dot product total for all of the entries in the shift array in the shift position in the pixel arrays in the input frames of the sliding group from the running dot product total for each entry in the shift array in the shift position in each pixel array in each input frame in the sliding group.

12. The accelerator of claim 11 wherein the input channels of pixel arrays include a red array, a green array, a blue array, and a depth array.

13. The accelerator of claim 11 wherein the kernel arrays include a red array, a green array, a blue array, and a depth array.

14. The accelerator of claim 13 wherein a shift array size is defined by a kernel array size.

15. A non-transitory computer-readable storage medium having embedded therein program instructions, which when executed by a processor causes the processor to execute a method of operating a convolutional neural network, the method comprising:
   receiving a plurality of input frames and a plurality of kernel channels, each of the input frames having a matching sequence of input channels of pixel arrays, the pixel arrays including a shift array that has a plurality of shift positions within the pixel arrays, each of the kernel channels including a plurality of kernel groups that correspond with the plurality of input frames, each kernel group having a matching sequence of kernel arrays that correspond with the sequence of pixel arrays of the input frame which corresponds to the kernel group;

determining a number of sliding groups from the plurality of input frames where each sliding group has a number of the input frames; and convolving the input frames in the sliding groups with the kernel groups in the plurality of kernel channels to generate a number of output frames that correspond with the number of sliding groups such that the input frames in a sliding group and the kernel groups in the kernel channels are convolved to generate an output frame that corresponds with the sliding group, the output frame having a number of output channels, each output channel having an output array, each output array having a number of entries that correspond with the plurality of shift positions of the shift array within the pixel arrays of the input frames, a last convolution to output a last frame of the number of output frames, the last frame having a last channel of the number of output channels, the last channel having a last output array;

generating a plurality of labels with probabilities based on the last frame, the last channel, and the last array; and outputting the label with a highest probability as a detected action pattern.

16. The medium of claim 15, wherein convolving a number of times includes:

determining a running dot product total for each shift position of the plurality of shift positions of the shift array in the pixel arrays of the input frames in a sliding group of the sliding groups; and generating the output array that corresponds with the sliding group by assigning the running dot product total for each shift position to a corresponding entry in the output array.

17. The medium of claim 16, wherein determining a running dot product total for each shift position of the shift array includes:

determining a running dot product total for all of the entries in the shift array in a shift position of the plurality of shift positions within the pixel arrays in the input frames in the sliding group; and determining a running dot product total for the shift position from the running dot product total for all of the entries in the shift array in the shift position in the pixel arrays in the input frames of the sliding group.

18. The medium of claim 17, wherein determining a running dot product total for all of the entries in the shift array in the shift position in the pixel arrays in the frames in the sliding group includes:

determining, frame by frame for the input frames in the sliding group, a running dot product total for an entry in the shift array in the shift position in each pixel array in an input frame; and determining the running dot product total for all of the entries in the shift array in the shift position in the pixel arrays in the input frames of the sliding group from the running dot product total for each entry in the shift array in the shift position in each pixel array in each input frame in the sliding group.

19. The medium of claim 18, wherein the input channels of pixel arrays include a red array, a green array, a blue array, and a depth array.

20. The medium of claim 18, wherein the kernel arrays include a red array, a green array, a blue array, and a depth array.

* * * * *